United States Patent [19]

Tsukada et al.

[11] Patent Number: 4,899,291
[45] Date of Patent: Feb. 6, 1990

[54] IMAGE PROCESSING SYSTEM

[75] Inventors: Masaharu Tsukada, Kasasaki; Shigeru Aoi; Takaaki Ashinuma, both of Yokohama, all of Japan

[73] Assignee: Canon Kabushiki Kaisha, Tokyo, Japan

[21] Appl. No.: 81,445

[22] Filed: Aug. 4, 1987

Related U.S. Application Data

[63] Continuation of Ser. No. 733,768, May 14, 1985, abandoned.

[30] Foreign Application Priority Data

| May 22, 1984 | [JP] | Japan | 59-103116 |
| May 22, 1984 | [JP] | Japan | 59-103117 |
| May 22, 1984 | [JP] | Japan | 59-103118 |

[51] Int. Cl.⁴ .................... H04N 1/21; H04N 1/23
[52] U.S. Cl. ................... 364/518; 364/900; 358/296; 358/300
[58] Field of Search ............. 358/280, 256, 257, 296, 358/300; 364/518, 519, 200, 900; 382/56, 57

[56] References Cited

U.S. PATENT DOCUMENTS

| 4,527,885 | 7/1985 | Ayata et al. | 358/256 |
| 4,564,864 | 1/1986 | Maeshima | 358/280 |
| 4,597,018 | 6/1986 | Sonobe et al. | 358/296 |
| 4,718,040 | 1/1988 | Ayata et al. | 364/900 |
| 4,731,672 | 3/1988 | Sugishima et al. | 358/296 |

*Primary Examiner*—L. T. Hix
*Assistant Examiner*—D. Rutledge
*Attorney, Agent, or Firm*—Fitzpatrick, Cella, Harper & Scinto

[57] ABSTRACT

An image system can output image information to a plurality of output devices at a time, has a function to print, display, or store an image information before all of the image information is completely read out, and has a function to output an image information stored in a memory device by using an interface, before the completion of reading all of the image information. The image processing system includes for an example a readout device for reading image information; a storage device for storing the image information from the readout device; an output device for printing or displaying the image information from the readout device; an interface device for outputting a read-out information to the output device before the image information is completely read out; wherein the image information from the readout device is stored into the storage device by using the interface device.

32 Claims, 19 Drawing Sheets

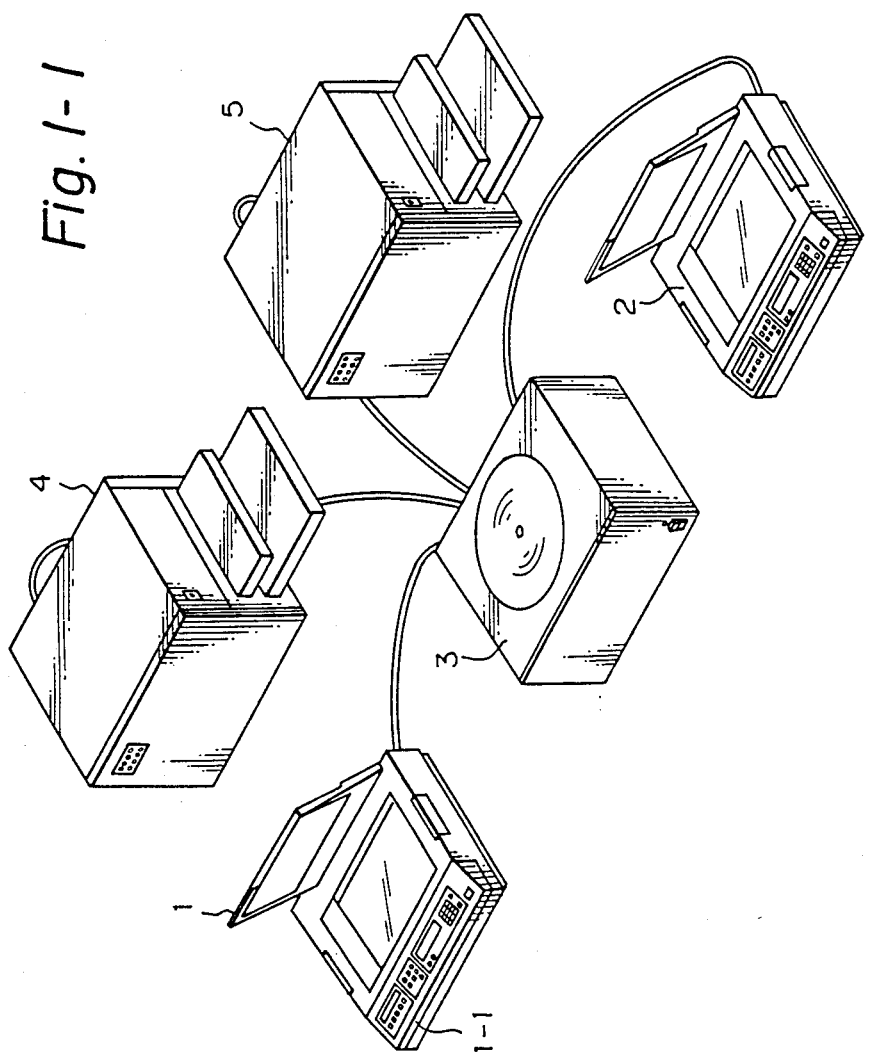
Fig. I-I

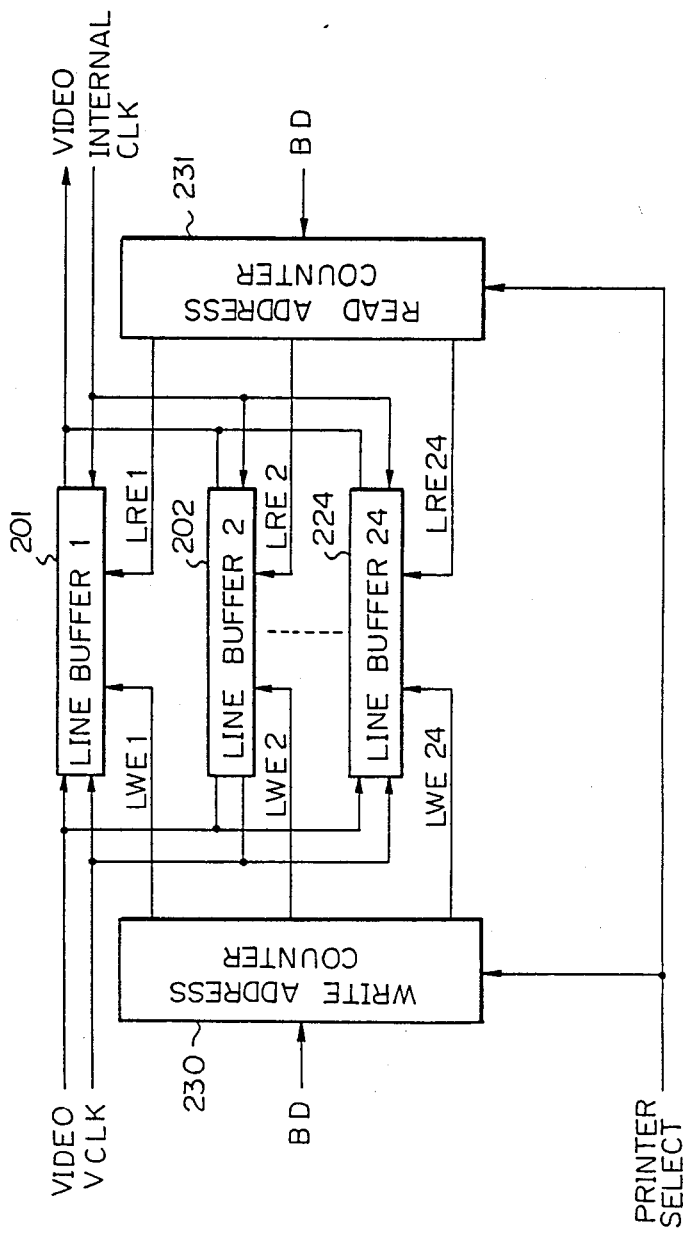

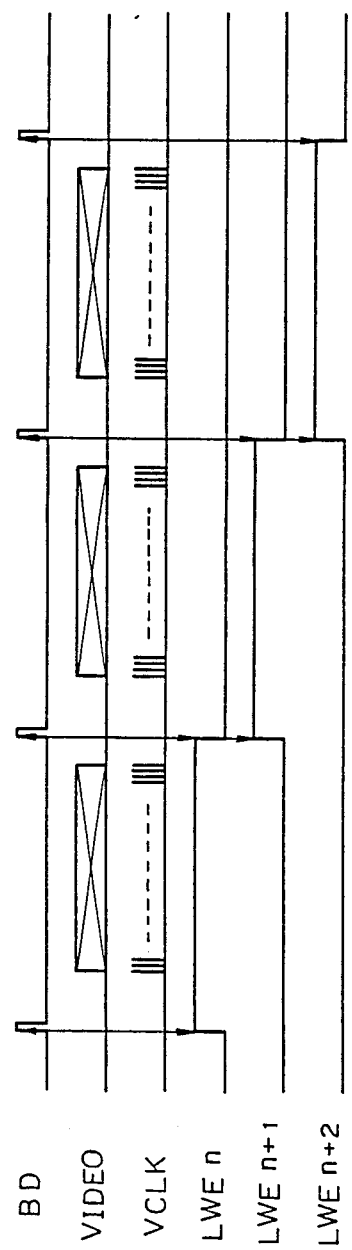

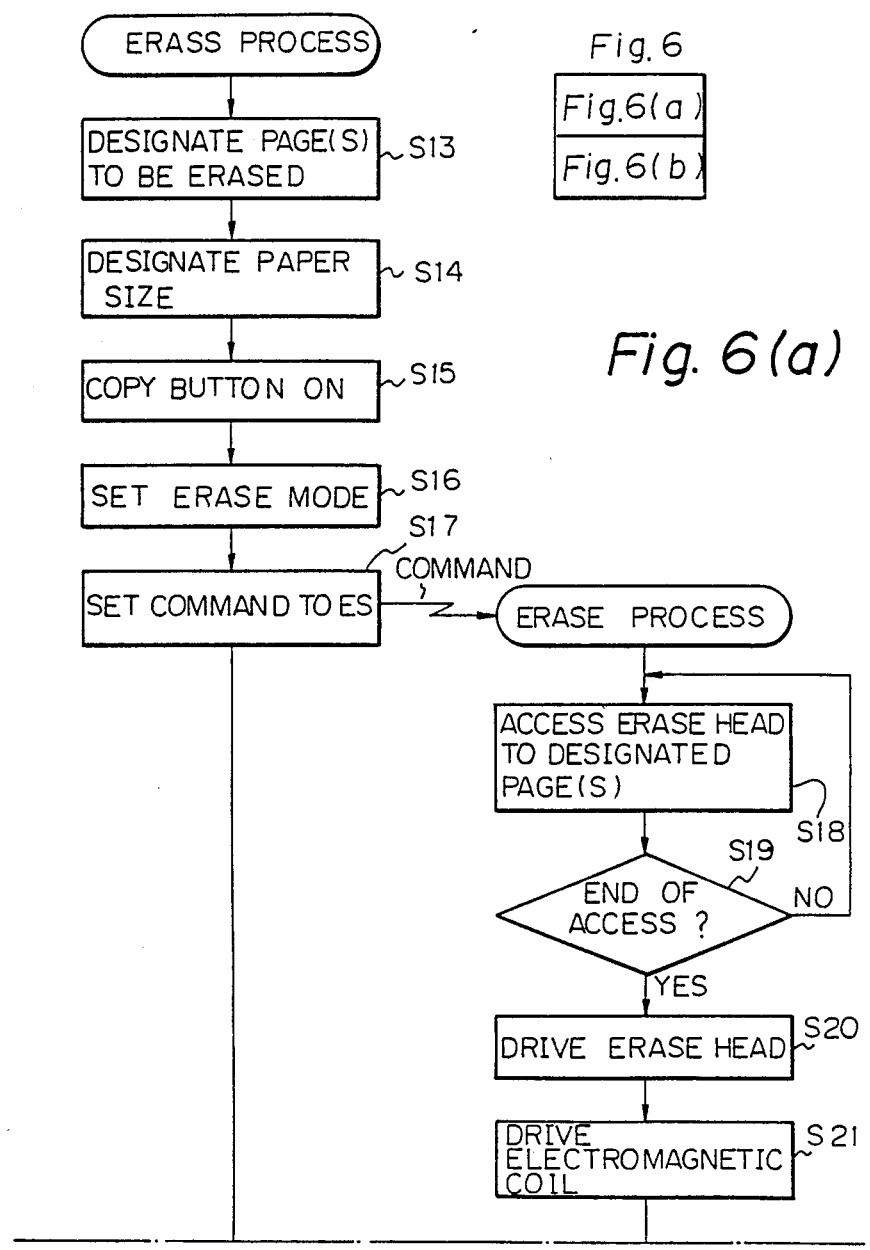

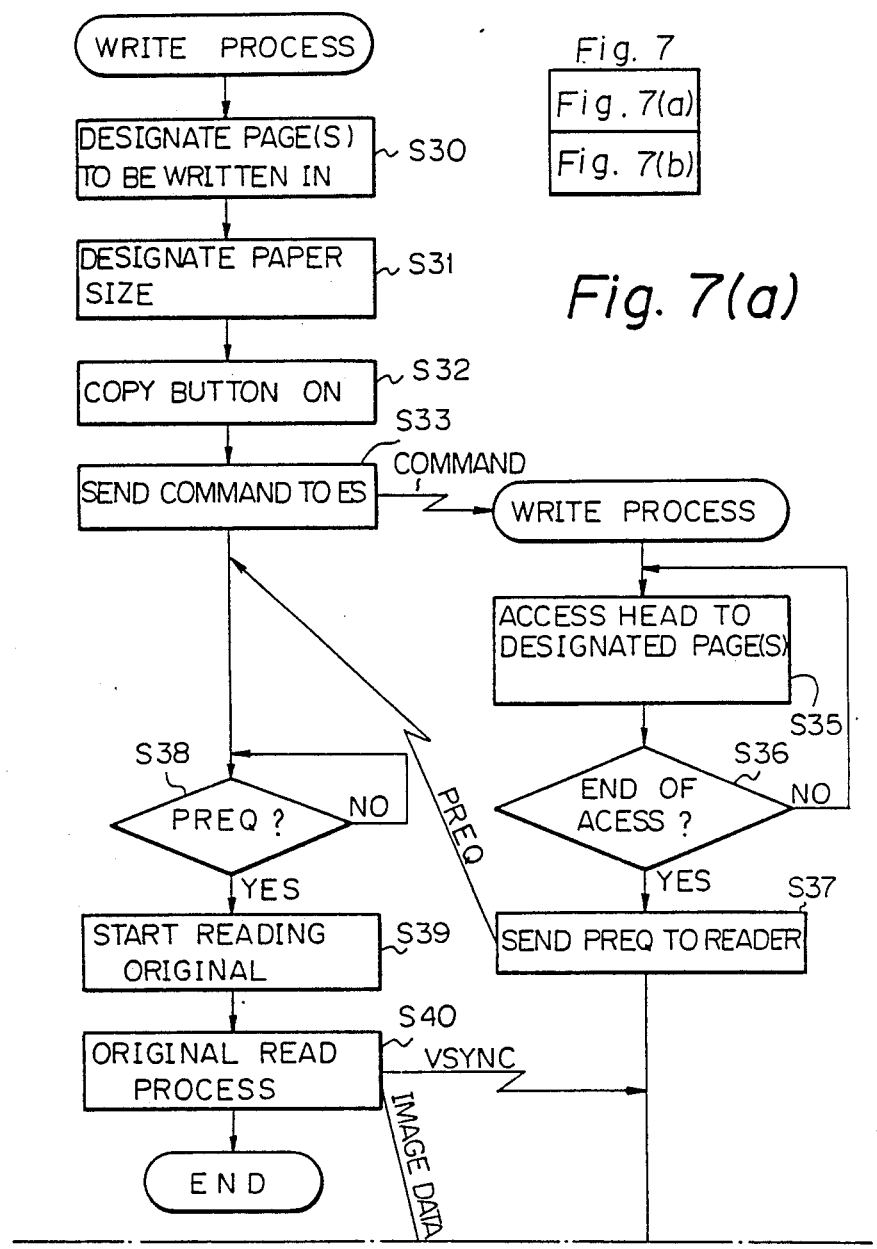

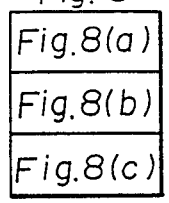
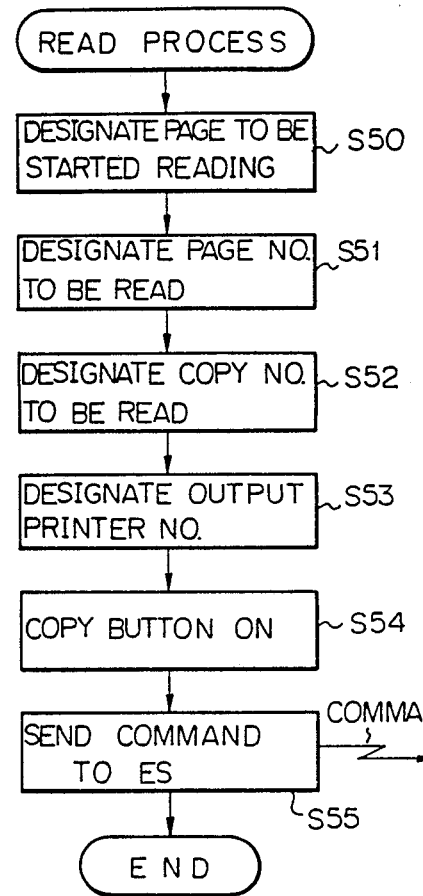
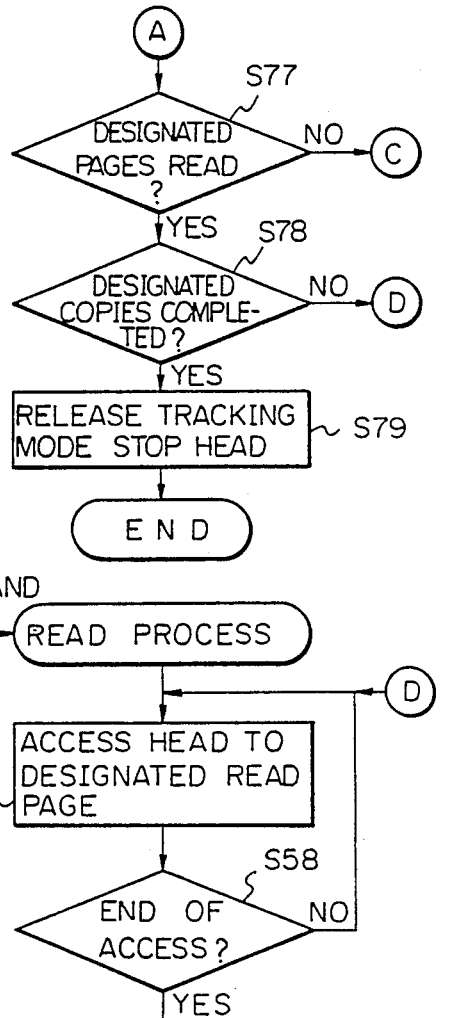

IMAGE PROCESSING SYSTEM

This is a continuation of application Ser. No. 733,768 filed May 14, 1985, now abandoned 12/7/87.

BACKGROUND OF THE INVENTION

1. Field of the Invention

The present invention relates to an image processing system.

2. Description of the Prior Art

In printing out information read out from a disk device, conventionally the information is read out from the disk memory and once stored in a page memory or the like. Thereafter, the stored information is again read out and delivered to a printer as data for printing. Process time is required however for storing data in the memory and for reading out the data therefrom, which results in real time printing being disadvantageous.

Furthermore, in case of storing information read out by a reader, the information is read out by the reader and once stored in a page memory or the like. Thereafter, the stored information is again read out and transferred to a disk device to store the information herein. Process time is required however for storing data in memory and for reading out the data therefrom, which results in a difficulty of read time storing.

Information transference between one reader to a plurality of printers or between one disk device to a plurality of printers are carried out in common. With conventional methods, the information is transferred to another printer after the information transference to one printer has been completed. Therefore, simultaneous information transference to a plurality of printers has been impossible.

SUMMARY OF THE INVENTION

It is an object of the present invention to eliminate the above drawbacks.

It is another object of the present invention to improve an image processing system.

It is still another object of the present invention to provide an image processing system which can concurrently output image information to a plurality of output devices.

It is a further object of the present invention to provide an image processing system having a function to print or display image information from a readout device on an output device before the completion of reading out all of the image information, and a function to store in a memory device a portion of the image information before the completion of reading out all of the information.

It is still a further object of the present invention to provide an image processing system which can output image information from a memory device to an output device before the completion of reading out all of the image information, by using an interface which stores the image information from a readout device before the completion of reading out all of the image information.

Other objects of the present invention will become apparent from reading the following description and claims in conjunction with the accompanying drawings.

BRIEF DESCRIPTION OF THE DRAWINGS

FIG. 1-1 is a perspective view of a processing system according to the present invention;

FIGS. 1-2(a) and 1-2(b) show cross sectional views of the structures of a reader and a printer;

FIGS. 2-1(a) and 2-1(b) are a block diagram of a photo-magnetic disk device;

FIG. 2-2 is a cross sectional view of the structure of an erase head;

FIG. 3-1 composed of FIGS. 3-1(a) and 3-1(b) is a block diagram of an interface circuit;

FIG. 3-2 is a block diagram of a buffer;

FIG. 3-3 is a timing chart for writing into line buffers;

FIG. 3-4 is a timing chart showing timings for write-in and readout;

FIG. 4 is a flow chart for key input processing;

DETAILED DESCRIPTION OF THE PREFERRED EMBODIMENT

Figures 1, 2, 2A:
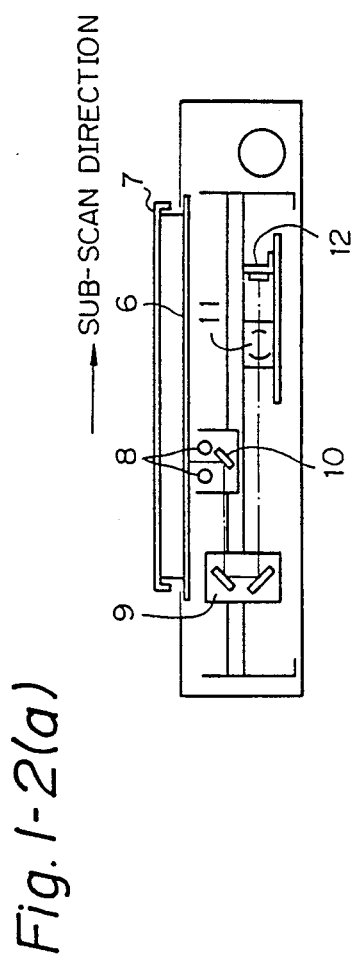

An embodiment of the present invention will be described with reference to the drawings. FIG. 1 is a perspective view illustrating the overall layout of one example of the processing system applicable to the present invention. Readers 1 and 2 read out respective original images, the signal lines of the readers 1 and 2 being connected to a disk device 3. An operation panel 1-1 of the reader has various keys on the panel, by which processings such as remote control over external equipment and image editing can be conducted. Printers 4 and 5 record images onto a recording material such as paper in accordance with information from the disk device 3 via the signal lines. The disk device 3 (hereinafter abbreviated as ES, where applicable) can overwrite the image information and has a maximum storage capacity of 100 sheets A4 size. The ES 3 is provided with connectors for the readers and printers, which will be described later.

In FIG. 1-1, although the ES 3 has two readers 1 and 2 and two printers 4 and 5 connected, the numbers of readers and printers are not intended to be limited to two but the ES 3 can connect at the maximum up to four readers and eight printers.

Cross sectional views of the structures of the reader 1 (or 2) and the printer 4 (or 5) are respectively shown in FIGS. 1-2(a) and 1-2(b). An original is placed on an original glass 6 by turning the printed side of the original down, the reference position for placing the original being set at the left side innermost as seen from the front side. The original is held in place upon the original glass by the original cover 7. The original is irradiated with a fluorescent lamp 8 and its reflected light is converged on the surface of a CCD 12 through an optical path defined by mirrors 10, 9 and a lens 11. The mirrors 10 and 9 are so arranged to move at relative speeds having a ratio of 2:1. The above optical unit moves from the left to the right at a constant speed under control of a PLL. The speed of motion is 180 mm/sec in the advance direction while the original is irradiated and is 468 mm/sec at the return direction. The resolution power in the sub-scan direction or in the direction of movement of the optical unit is 16 lines/mm. The size of an original the reader can handle with is from A5 to A3. The direction of an original to be placed is perpendicular for A5, B5 and A4 sizes, while it is lateral for B4 and A3 sizes.

The return movement of the optical unit is performed such that when the optical unit passes over an unrepresented image top sensor indicative of the top of the original, the count operation for clock pulses starts and continues until the number of clock pulses corresponding to the length of the original is counted, and at that time the optical unit is reversed. In measuring the length of an original, it may be performed by recognizing the original area while prescanning or by calculating from the magnification ratio and the size of the cassette wherein recording papers selected are accomodated.

The main scan width along the main scan direction depends upon the direction of an original placed and takes the maximum width of 297 mm which is the longitudinal length of A4 size. Since the resolution power for the maximum width is set as 16 dot/mm, the number of bits for the CCD requires 4752 (=297×16). Therefore, in the present apparatus, two 2688 bit CCD array sensors are driven in parallel. Under the conditions of 16 lines/mm and 180 mm/sec, the main scan period T (=storage time of the CCD) becomes $$T = \frac{1}{180 \times 16} = 347.2 \text{ } \mu\text{sec}.$$

The transference speed of the CCD becomes $$f = \frac{2688}{347.2 \text{ } \mu\text{sec}} = 7.7419 \text{ MHz}.$$

Figures 1, 2, 2B:
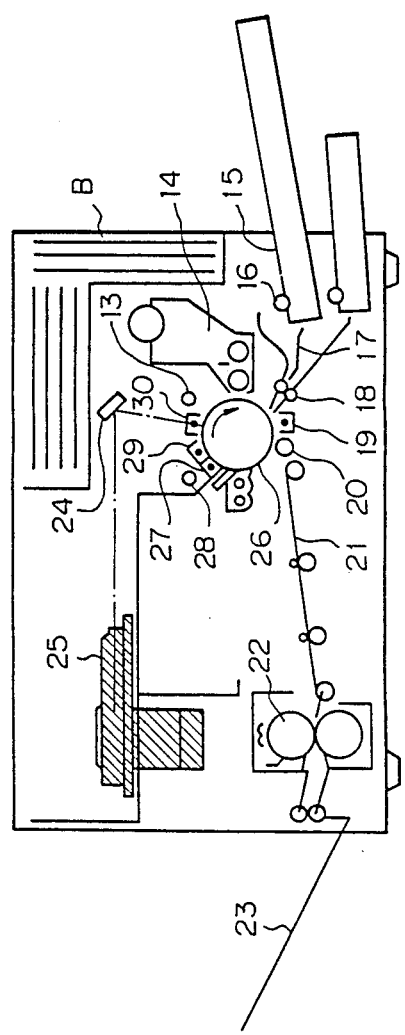
Figures 1A, 2:
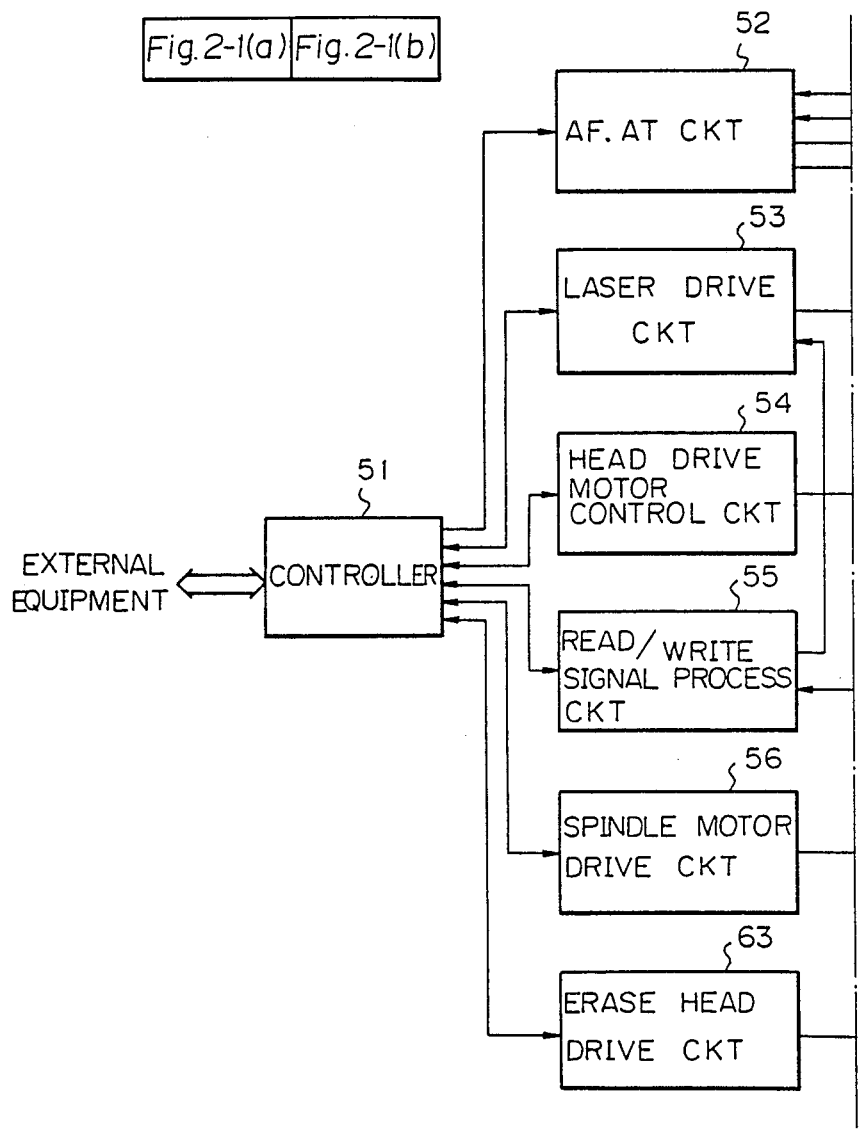
Figures 1B, 2:
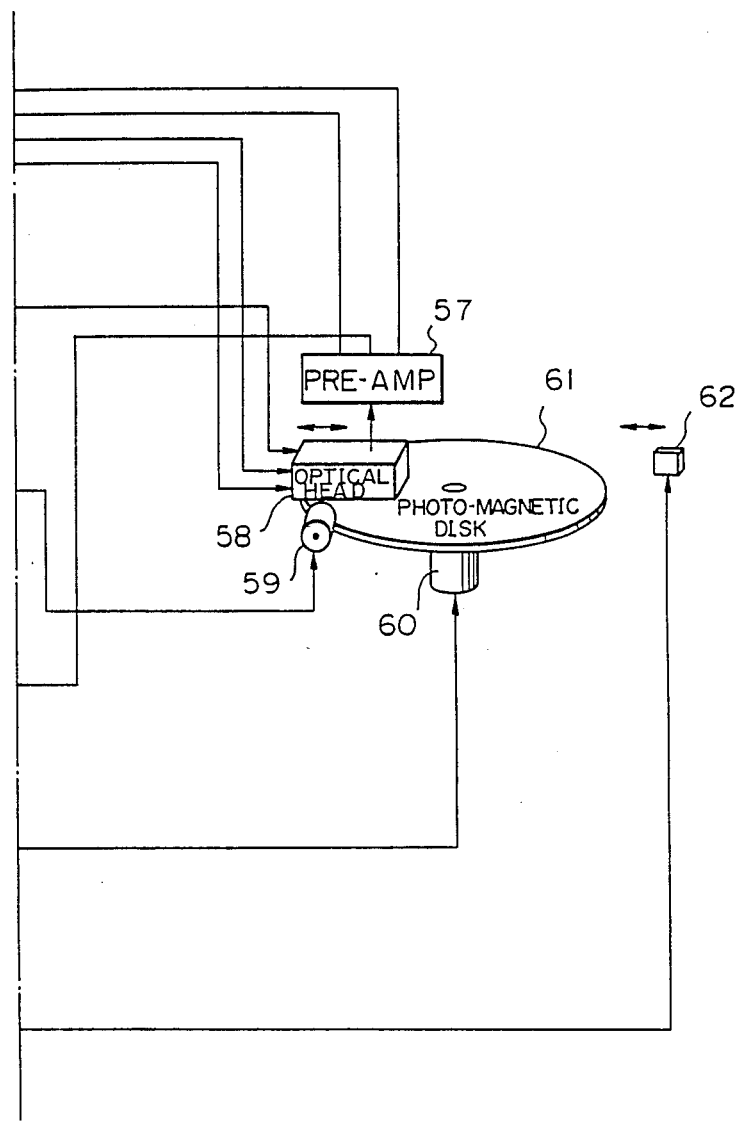
Figure 2:
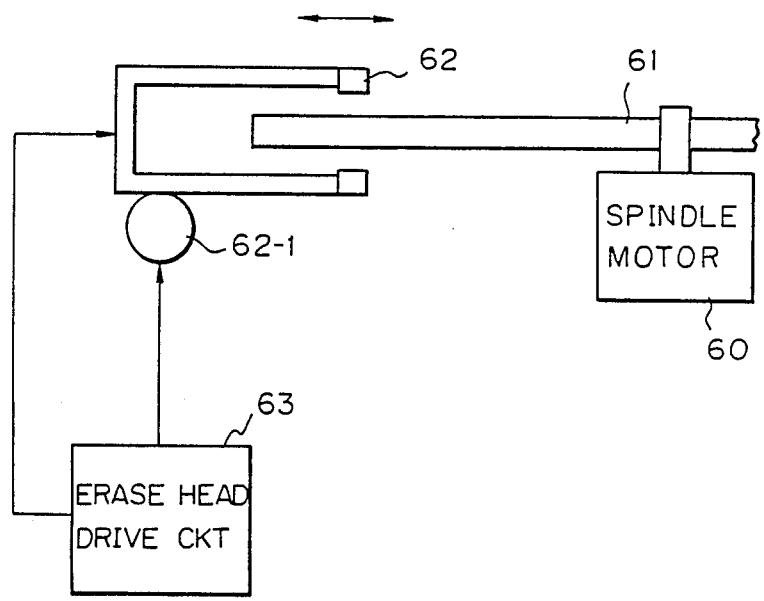

Next, the printer will be described by referring to the cross sectional view of FIG. 1-2(b). An image signal converted in a bit serial form at a reader is inputted to a laser scan optical system unit 25 of the printer. The unit comprises a semiconductor laser, collimator lens, rotary polyhedral mirror, F$\theta$ lens, and fall compensation optical system. The image signal from the reader is applied to the semiconductor laser and subjected to electro-optical conversion. Laser rays outputted from the semiconductor laser are transformed into parallel rays through the collimator lens and projected upon the rotary polyhedral mirror rotating at a high speed. The laser rays are then scanned by the polyhedral mirror in the axial direction of a photosensitive body 26. The number of revolutions of the polyhedral mirror is 2,600 rpm, the scan width is about 400 mm, and the effective image width is 297 mm which is the longitudinal length of A4 size. Laser rays from the above-described unit 25 are irradiated upon the photosensitive body 26 through a mirror 24.

The photosensitive body 26 comprises for example three layers, electrically conductive layer —photosensitive layer—insulation layer. Process components for enabling image formation are disposed in association with the photosensitive body 26. That is, numeral 27 represents a pre-discharge, 28 represents a pre-discharge lamp, 29 represents a primary charger, 30 represents a secondary charger, 13 represents a front exposure lamp, 14 represents a developer, 15 represents a paper feed cassette, 16 represents a paper feed roller, 17 represents a paper feed guide, 18 represents a resist roller, 19 represents a transfer charger, 20 represents a separation roller, 21 represents a feed guide, 22 represents a fixer, 23 represents a paper withdrawal tray. The speeds of the photosensitive body 26 and its feed system are 180 mm/sec the same as the speed of the reader along its advance direction. Therefore, the copy speed while using the combination of the reader and the printer is 30 sheets/min for A4 size. The printer employs a separation belt for separating a copy paper tightly fixed to the photosensitive drum 26, the separation belt being mounted in front of the drum 26. The presence of the separation belt causes a lack of an image by the amount corresponding to the belt width. If signals are made active on the portion corresponding to the belt width, the portion is developed with toner which makes the separation belt dirty and hence the following papers may also be made dirty with toner. Therefore, video signals for the print-out are previously cut at the reader during the time corresponding to the separation belt width of 8 mm. Furthermore, if toner is attached at the top of a copy paper, the top is wound about the fixer roller during the fixation operation, which becomes one of the reasons of jamming. Therefore, electrical signals are also cut at the reader least the 2 mm top portion of the paper should be affixed with toner.

FIG. 2-1 is a block diagram showing the arrangement of the photo-magnetic disk device. Controller 51 controls the transference of information to and from external equipment (in the present embodiment, readers and printers) and controls the operation of the photo-magnetic disk 61.

An AF.AT circuit 52 is a control circuit which adjusts the focal position of an objective lens (not shown) of an optical head 58 so as to locate it always on the disk 61 (auto-focussing mechanism) and also adjusts during the reading operation the objective lens so as to locate it always on the portion (track) where data has been written (auto-tracking mechanism). In order to conduct the above controls, reflected rays from the laser rays projected upon the disk surface are detected by a photosensor (not shown) within the optical head 58. The detected signal is amplified at a pre-amplifier 57 and is inputted to the AF.AT circuit 52. The detected signal also includes read signals written in the disk 61, the read signals being transferred to the pre-amplifier 57 and hence to a read/write signal processing circuit 55.

A laser drive circuit 53 drives the semiconductor laser (not shown) which serves as a light source of the optical head 58. During the writing operation, the circuit 53 operates to on/off modulate the semiconductor laser in accordance with a write signal transferred from the read/write signal processing circuit 55. During reading operation, the laser rays are irradiated at about one fifth of the intensity of the writing operation.

A head drive motor control circuit 54 controls a head drive motor 59 which moves the optical head 58 in the radial direction of the disk 61.

The read/write signal processing circuit 55 modulates (in the embodiment, the modulation is MFM) image data transferred from the external equipment or reader, outputs the modulated signal to the laser drive circuit 53 to thereby write it into the disk, and also demodulates a read signal from the optical head 58 and hence pre-amplifier 57 to transfer it to the external equipment or printer.

A spindle motor drive circuit 56 controls the rotation of a spindle motor 60 which makes the disk 61 rotate (for example, at 1800 rpm).

An erase head drive circuit 63 drives an erase head 62 in the radial direction of the disk while data having written in the optical disk 61. The construction of the erase head is shown in FIG. 2-2.

Numeral 62 represents an erase head mounted on both sides of the photo-magnetic disk 61. On the tip of the erase head, an electromagnetic coil is wound. As current flows through the coil, a magnetic force is generated to erase written data. The generation of magnetic force is controlled by the erase head drive control circuit 63 which also controls an erase head drive motor 62-1. In this case, since the electro-magnetic coils are disposed on both sides of the disk, it is possible to suppress the spread of magnetic fluxes.

Other than the above method of compulsorily erasing with magnetic force, information can also be erased by irradiating laser rays of the same intensity as during the writing operation onto the portion desired to be erased and at the same time by generating magnetic force to some degree.

Figures 1A, 3:
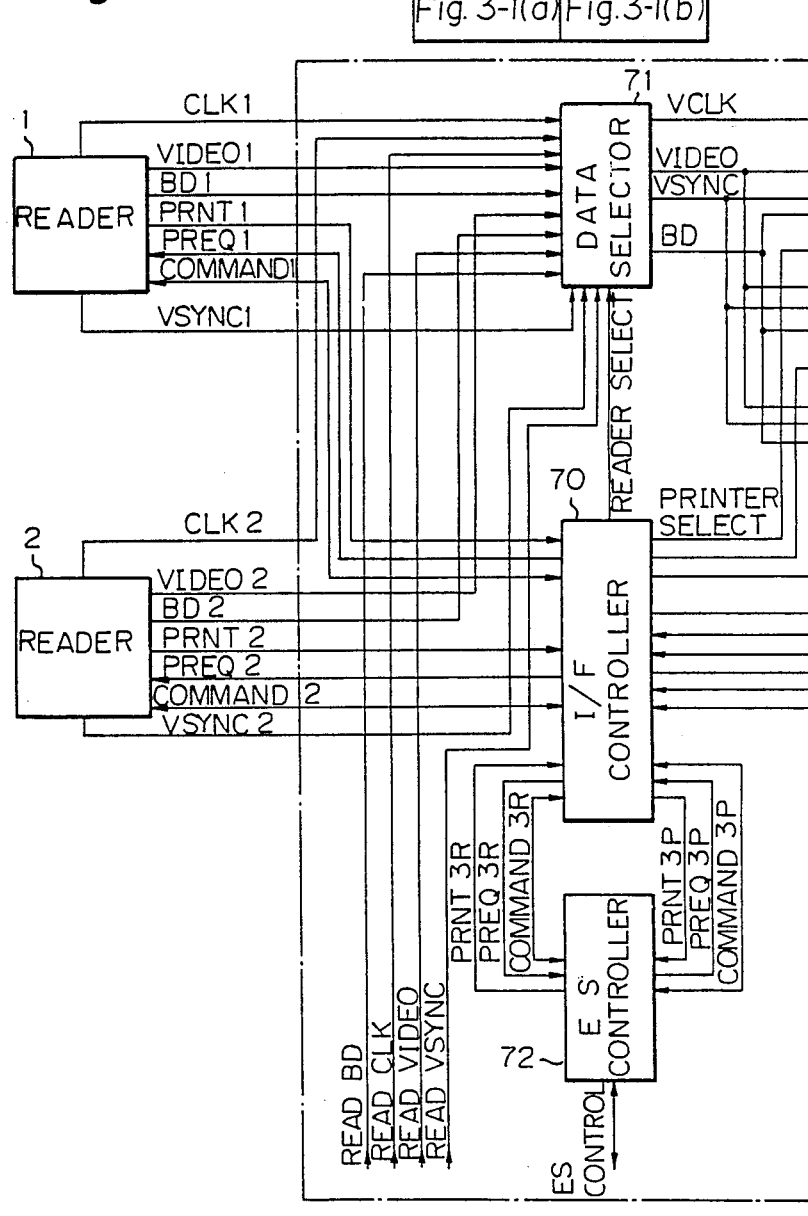
Figures 1B, 3:
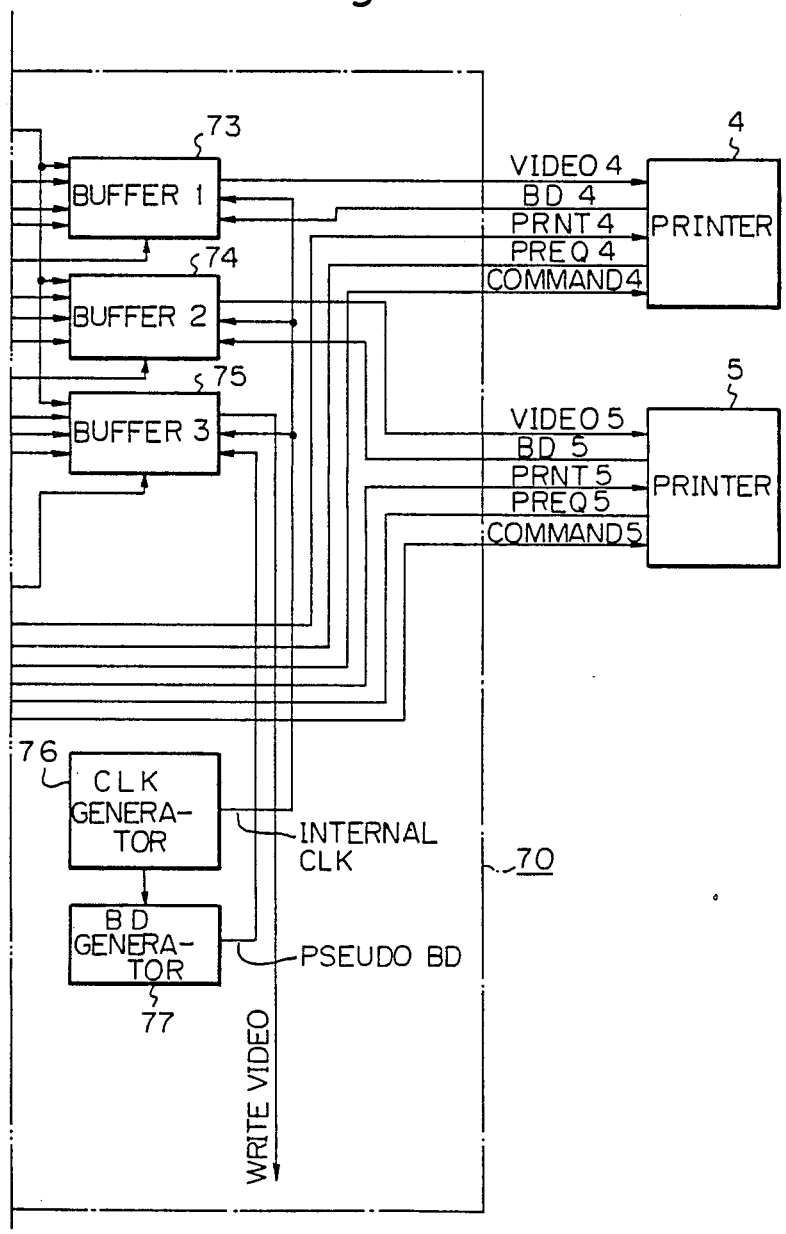

FIG. 3-1 is a block diagram of the circuit portion of the controller 51 shown in FIG. 2-1 operating to control the external equipments.

The circuit portion functions to select one of image signals from the reader 1, reader 2, and the disk 3 and output the selected image signals to one or more of the printer 4, printer 5 and disk 3. The selection and output operations are controlled by an interface controller 70 to which signal lines for each of the devices is connected. The interface controller 70 judges, in accordance with command information (command 1, command 2) transmitted from the reader 1 and reader 2, which signals from any one of the reader 1, reader 2 and photo-magnetic disk device 3 are to be received and to which apparatus among the printer 4, printer 5 and photo-magnetic disk device 3 the received signals to be transferred. A data selector 71 receives, from the readers 1 and 2, an image signal (hereinafter referred to as VIDEO signal), clock (hereinafter referred to as CLK), signal indicative of the top of an one page image (hereinafter referred to as VSYNC) and horizontal synchro signal (hereinafter referred to as BD signal), and receives as readout signals from the disk a readout VIDEO signal, readout CLK, readout VSYNC and readout BD signal. The data selector 71 selects, in accordance with a select signal from the interface controller 70 corresponding to the command information, any one of signal groups: VIDEO 1, CLK 1, VSYNC 1 and BD 1; VIDEO 2, CLK 2, VSYNC 2 and BD 2; and readout VIDEO, readout CLK, readout VSYNC and readout BD. The selected signal group is outputted to any one of the first, second and third buffers, respectively represented by numerals 73, 74 and 75. In addition, any one or more of the first, second and third buffers are selected in accordance with a printer select signal obtained under the judgement of the interface controller 70 to thereby start driving the printers or photo-magnetic disk corresponding to the selected buffer or buffers. The first buffer corresponds to the printer 4, the second buffer to the printer 5, and the third buffer to the optical disk device 3.

The structure of the buffer is shown in FIG. 3-2.

Each of the buffers comprises a write address counter 230, read address counter 231 and twenty-four line buffers 201 to 224. The line buffer may be a shift register of 47254 bits, to which the VIDEO signal and VCLK (video clock) signal from the data selector 71 are inputted. The VCLK signal is a reference clock for writing the VIDEO signal into the shift register. Also, inputted to the line buffer are a signal (hereinafter referred to as LWE signal) from the address counter 230 enabling writing in the line buffer and a signal (hereinafter referred to as LRE signal) from the read address counter 231 enabling reading out the line buffer. The data input and output are selected by the LWE signal and LRE signal. The write address counter 230 is a counter selecting to which line buffer the VIDEO signal selected by the data selector 71 is written in. The write address counter 230 uses as a select signal of the line buffer the BD signal from the data selector 71. In particular, every time the BD signal is inputted, the LWE signal is sequentially selected one by one, and the VIDEO signal is written in the corresponding line buffer. The read address counter 231 is a counter selecting from which line buffer the VIDEO signal is read out. The read address counter 231 uses as a select signal of the line buffer the BD signal from the printers or disk. Every time the BD signal is inputted, the LRE signal is sequentially selected by one by one, and the VIDEO signal is read out from the corresponding line buffer. The write address counter 230 and read address counter 231 receive a printer select signal from the interface controller 70 to thereby enable the count operation of the address counter of the buffer corresponding to the desired printer or disk while prohibiting the count operation of the other address counter of the buffer.

FIG. 3-3 is a timing chart showing write timings for the line buffer. As the BD signal is inputted to the write address counter, in synchronization with this input an LWEn signal (to be written in a line buffer n) is turned ON so that the line buffer n is enabled to be written in. After a certain time lapse from the input of the BD signal, the VIDEO signal and VCLK signal are inputted and written into the buffer n. At the leading edge of the next BD signal, the LWEn signal is turned OFf while the LWEn+1 signal is turned ON. Therefore, the write-in to the line buffer n is prohibited while the write-in to the line buffer n+1 is enabled. In the similar manner, the line buffer enabled its write-in is shifted upon every input of the BD signal.

Figures 3, 4:
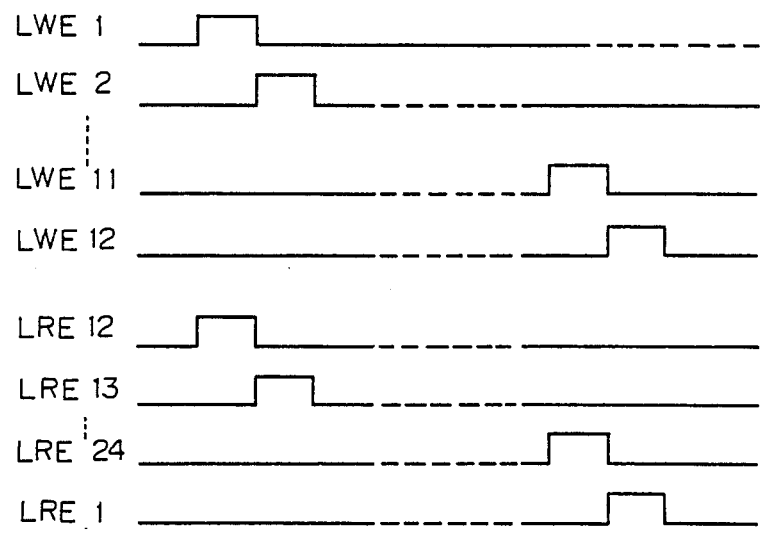
Figure 4:
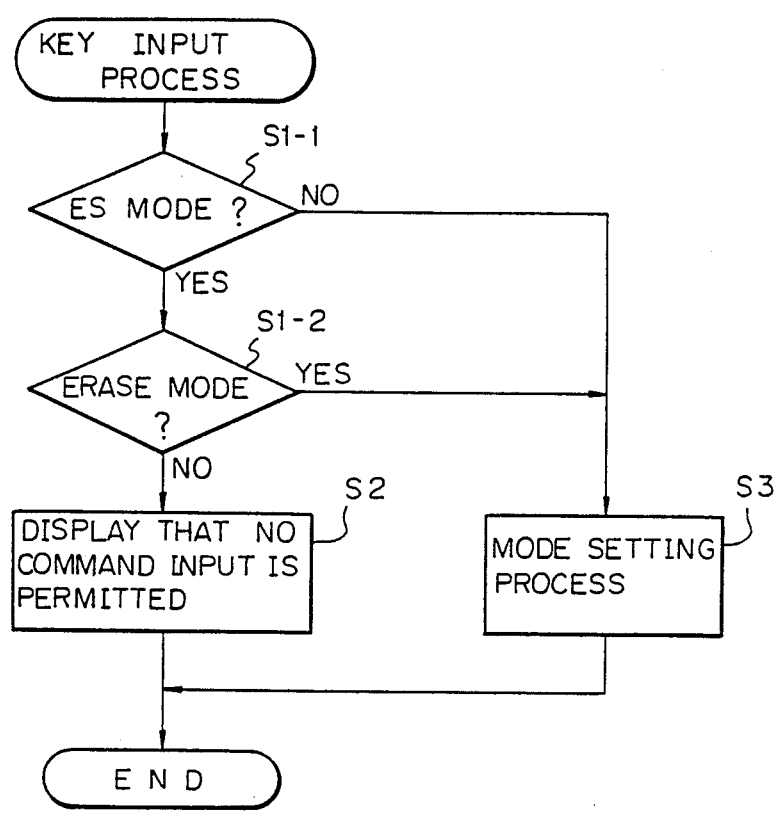

FIG. 3-4 is a timing chart showing write and read timings for the line buffer. For instance, while the line buffer 1 is written in, the line buffer 12 is read out; and while the line buffer 2 is written in, the line buffer 13 is read out. In case the write and read speeds are not identical, the read-out line buffer deviates from 13 to 14 and to 15 or from 12 to 11 and to 10 while the line buffer 1 is written in. The deviation can be absorbed if the line buffer does not deviate up to the line buffer 1. Therefore, since the input from the printers or disk and the output to the printers or disk can be synchronized with each other, the image from the readers or disk can be outputted or written to the printers or disk in real time. Furthermore, since buffers are provided each corresponding to the printers or disk, the image can be simultaneously outputted to a plurality of printers or disks, in such a way that based upon printer select signals, two buffers, e.g., first and second buffers, are selected; VCLK, VIDEO, VSYNC and BD signals are transferred to both buffers; and the outputs of the VIDEO signals to both printers are synchronized at the line buffers.

An ES controller 72 controls the operation of the photo-magnetic disk 3. In case the write operation into the photo-magnetic disk is selected in accordance with the printer select signal, PRNT3P. PREQ3P and command 3P, that is, signals equivalent to the signals from printers are inputted to the interface controller. In case the read operation out of the optical disk device is selected in accordance with the reader select signal, PRNT3R, PREQ3R and command 3R, that is, signals equivalent to the signals from readers are input to the interface controller. In particular, the photo-magnetic disk device 3 performs the same function as the readers or printers during its read or write operation. Numeral 76 represents a clock generator which generates clock signals for reading out the VIDEO signal from the buffer. Numeral 77 represents a pseudo BD generator which counts one line clock signals from the clock generator 76 and generates the BD signal for the write-in operation to the disk. The interface controller 70 is included within the optical disk device 3.

The BD signal for use in printing by reading the disk may be a signal obtained from the printer by detecting the beam upon every one line laser scan, or may be the pseudo BD as described above. In the latter case, it is possible to avoid read errors which might be caused from fluctuation of laser beams.

Next, the operation of the sequence controller 51 will be described. The following flow chart follows the computer programs contained in the controller 51.

FIG. 4 is a flow chart of key input processes of the sequence controller 51. First, upon a key input from an operation section 1-1 provided on the reader, a judgement is made (STEP S1-1) whether it is an ES mode (write, erase or read mode for the photo-magnetic disk at that time). In the case of the ES mode, an erase mode or not is judged (STEP S1-2). If it is an erase mode, a mode setting process is performed (STEP S3). And if not, a disabled command input is displayed to prohibit the following command input of the other modes (STEP S2). In the case of other than the ES mode, a mode setting process corresponding to the key input is performed (STEP S3). By virtue of the above control processings, it is understood that command inputs are not permitted even during the write or read operation of the disk. Therefore, it does not waste time.

Figure 5:
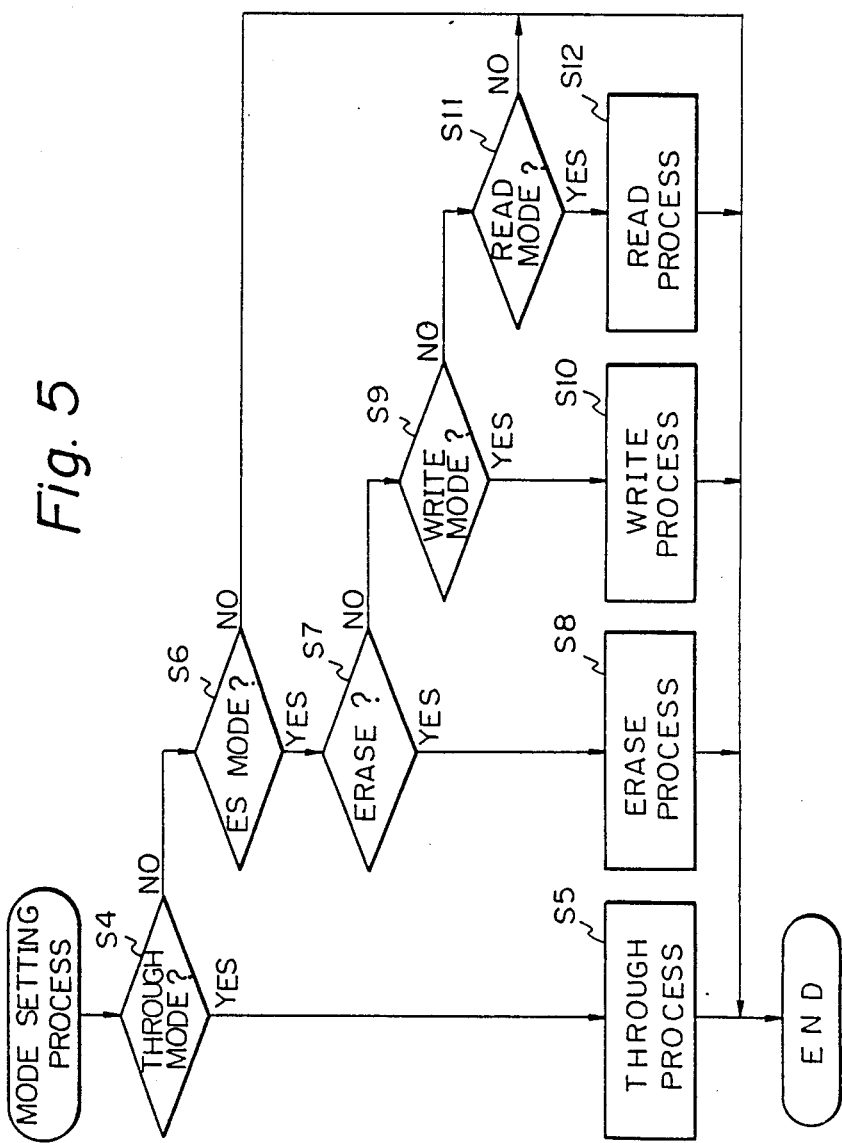
FIG. 5 is a flow chart for mode setting processings.

FIG. 5 is a flow chart of the mode setting processes at STEP S3 shown in FIG. 4. First, it is judged (STEP S4) whether the command input is a through mode (a mode wherein a readout image from the reader is directly outputted to the printer). If it is a through mode, a through process is performed (STEP S4). If not, ES mode or not is judged (STEP S6). In the case of ES mode, whether it is an erase mode, write mode, or read mode is judged (STEP S7, S9, S11) to follow the respective processes (STEP S8, S10, S12).

The through process (STEP S5) performs reading the image from the desired reader and outputting of the image to the desired printer.

Figure 6B:
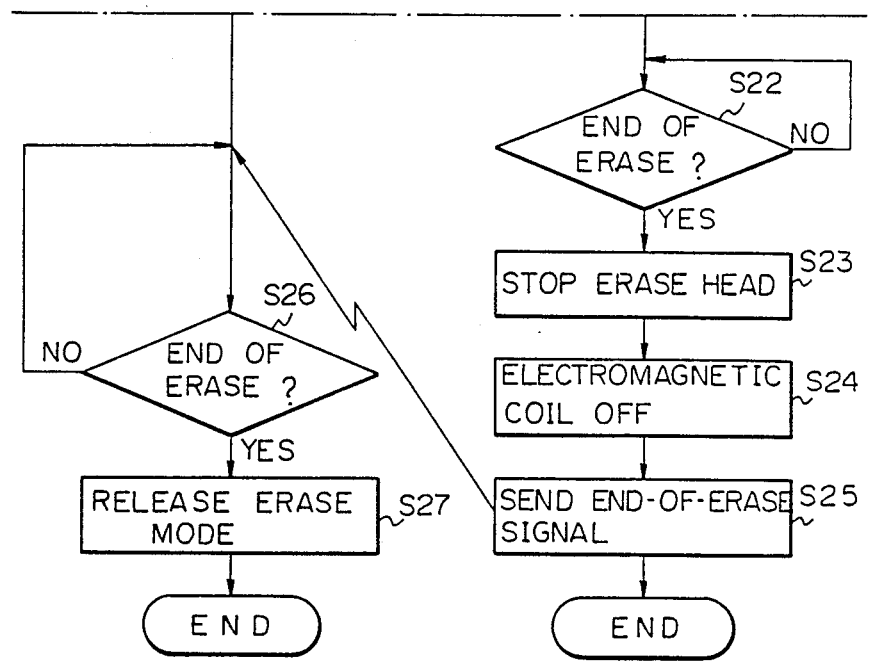
FIG. 6 composed of FIGS. 6(a) and 6(b) is a flow chart for erase processings.

FIG. 6 is a flow chart for the erase processes. First, the page desired to be erased and the paper size are designated through the operation section of the reader (STEP S13, S14). Upon depression of a copy button (STEP S15), an erase mode is set (STEP S16) and a command is transferred to the ES (STEP S17) to wait for an erase end signal from the ES (STEP S26). As the ES receives a command signal, it makes the erase head 62 have access to the track corresponding to the designated erase page (STEP S18, S19). The access position of the head is determined by counting pulses generated during the head movement. After the end of the head access, the erase head 62 starts driving (STEP S20) and its electromagnetic coils are energized to produce magnetic force to start the erase operation (STEP S21, S22). After completion of the erase of the designated page (after counting the pulses corresponding in number to one page), driving the erase head 62 is stopped, the electromagnetic coils are turned OFF, and an erase end signal is delivered to the reader (STEP S23, S24, S25).

After the reader receives the erase end signal, the erase mode is released (STEP S27).

Figure 7B:
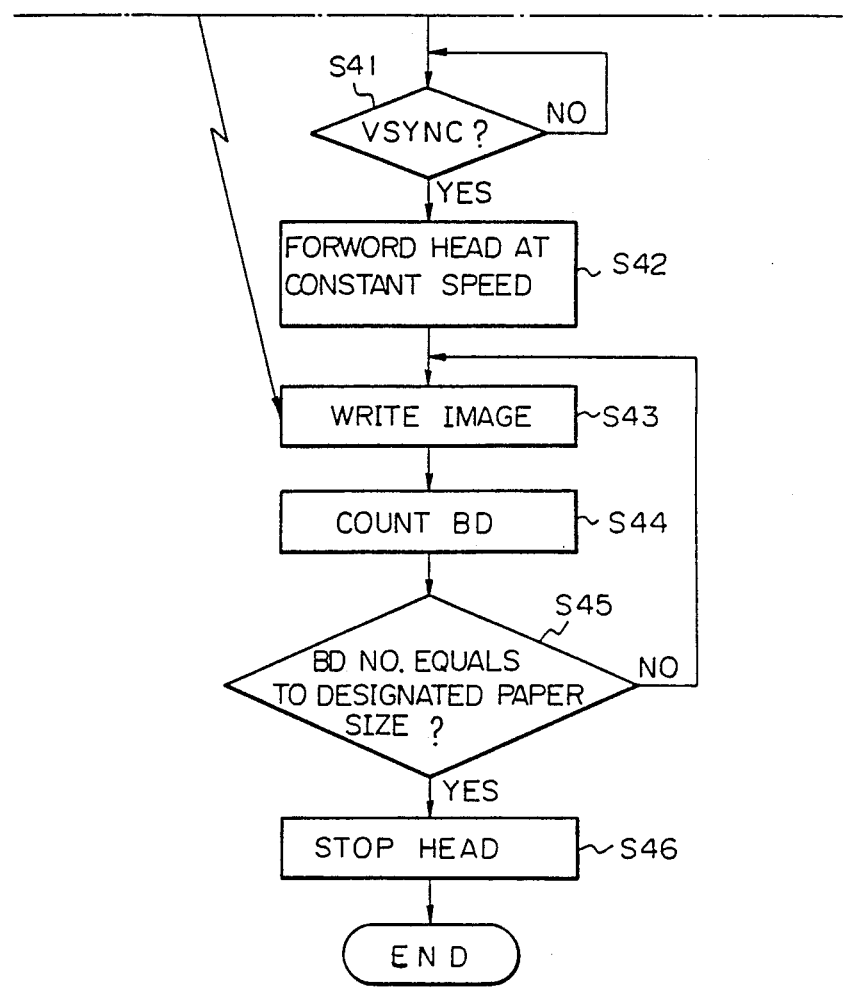
FIG. 7 composed of FIGS. 7(a) and 7(b) is a flow chart for write processings.

FIG. 7 is a flow chart for the read processes. First, the page of the disk to which a write operation is executed is designated through the operation section of the reader (STEP S30) and the size of an original to be read is designated (STEP S31). As the copy button on the reader is depressed, the above input items are determinedly set (STEP S32) and the appointed command is sent (STEP S33) to the ES (photo-magnetic disk device) to wait for a signal (hereinafter referred to as PREQ signal) requesting the output of the image data from the ES (STEP S38). Until the time the copy button is depressed, the input items may be altered. As the ES receives the command signal, it judges which reader has been selected and identifies the data selector (STEP S34). The head is accessed to the track corresponding to the appointed write page (STEP S35, S36). This access position is determined by counting pulses generated during the head movement. Upon the end of the access, the ES controller sends a PREQ signal through the interface controller to the selected reader (STEP S37) to wait for a signal (hereinafter referred to as a VSYNC signal) indicative of the top of the image from the reader (STEP S41). Upon reception of the PREQ signal, the reader starts reading the original (STEP S39) and sends the VSYNC signal to the ES and succeedingly the VIDEO signal and BD signal (STEP S40). Upon reception of the VSYNC signal, the ED advances its head in the radial direction (toward the center) at a constant speed (STEP S42). Upon reception of the VIDEO signal from the disk starts (STEP S43). At the same time, the pseudo BD signals (horizontal synchro signal) are counted (STEP S44) until the original of the designated size is completely read out (STEP S45). As the number of count values of BD signals becomes equal to the count number corresponding to the designated original size, the head is stopped and held at that position until the next VSYNC is received, and the write operation is terminated (STEP S46).

Figure 8B:
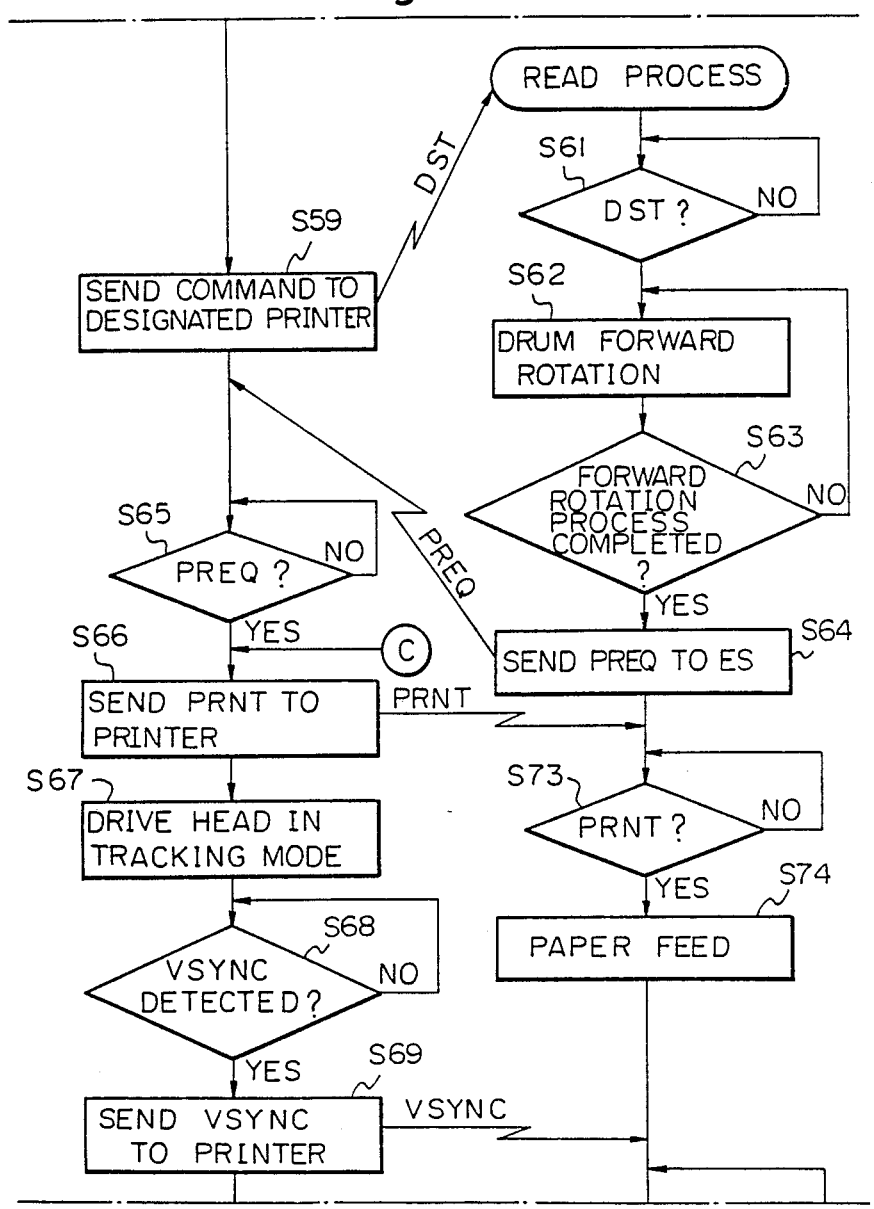
FIG. 8 composed of FIGS. 8(a), 8(b) and 8(c) is a flow chart for read processings.
Figure 8C:
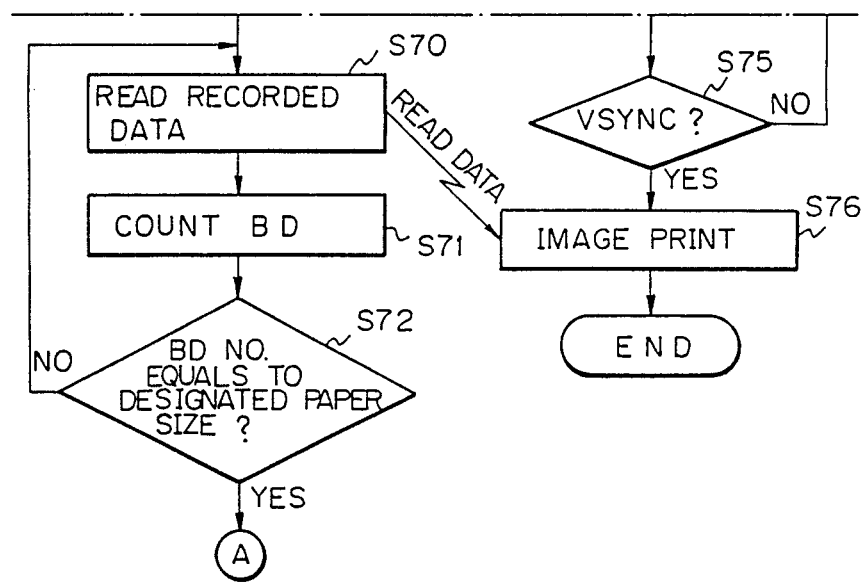

FIG. 8 is a flow chart for the read processes. First, by the key inputs through the operation section of the reader, the read start page, the number of read pages counting from the start page, the number of copies, and the number of output printer are designated (STEP S50, S51, S52, S53). By depressing the copy button, the above appointed items are deteminedly set (STEP S54) and the command signal is sent to the ES (STEP S55). As the ES receives the command signal, the output signal from the data selector and the buffer are selected in accordance wtih the command signal. In this state, the signal line from the reader is intercepted. The ES makes the head have access to the position corresponding to the designated read page (STEP S57, S58). Upon completion of the access, the command signal (drum start signal DST) is sent to the designated printer (STEP S59) to wait for a PREQ signal from the printer (STEP S65). The printer receives the command signal, and if it includes the DST signal, the forward rotation process for the drum is performed (STEP S60, S61, S62). After the forward rotation process is completed, the PREQ signal is sent to the ES (STEP S64) to wait for a PRNT signal from the ES. AS the ES receives the PREQ signal, it delivers the PRNT signal to the printer (STEP S66). As the printer receives the PRNT signal, the printer feeds a paper within the cassette of the printer to the resist roller. With the paper positioned at the resist roller (STEP S74), the printer waits for a VSYNC signal from the ES (STEP S75). As the ES outputs the PRNT signal, it moves (STEP S67) the head while controlling for the auto-tracking and the auto-focussing (tracking mode). If the VSYNC signal is detected during the head movement, the VSYNC signal is outputted to the printer (STEP S68, S69). Then, the read operation of the written data starts and the read data (read VIDEO signal) is transferred to the buffer and further to the printer (STEP S70). At the same time, the read BD signals are counted (STEP S71) until the count value equals to that corresponding to the paper size (STEP S72). As the printer receives the VSYNC signal, the resist roller is driven into rotation to thereby feed the paper to the photosensitive body and perform an image print process through transfer (STEP S76). The ES moves the head to detect the following VSYNC signals until the designated number of pages are completely read out (STEP S77). The end of reading the designated number of pages is judged by counting the corresponding number of VSYNC signals to that of the designated pages. After completion of reading out the designated number of pages, the above operations are repeated until the designated number of copies are completely read out (STEP S78), that is, until the counter, incrementing its count value every time the designated number of pages are read out, counts the designated number of copies. Upon completion of reading the designated number of copies, the tracking mode is released and the head is stopped to thereby terminate the read operation (STEP S79). In case the outputs to a plurality of printers are desired, the wait process continues until the PREQ signal representative of the number of printers designated at STEP S65 is received, thus enabling the simultaneous outputs to a plurality of printers.

In case the pages desired to be read are not continuous with a break page or pages, only the desired pages can be read out without interruption in the desired order of pages in such a manner that a memory (programmable memory) capable of storing the key inputs for a plurality of pages is provided on the reader, and the memory contents are read out upon the end of reading every page to send a command to the ES.

In the present embodiment, the key input operation has been made by using the operation section of the reader, however, a device may separately be provided which can control the overall system. Furthermore, in order to visualize the image, display devices as well as printers may be utilized.

The present invention is not intended to be limited to the above embodiment, but various variations which fall within the scope of claims may be made.

What we claim is:

1. An image processing system comprising:
   a memory medium capable of storing image information representative of a plurality of images;
   designating means for designating desired image information to be read out from said memory medium and which corresponds to a plurality of pages;
   readout means for reading, in order, image information designated by said designating means, from said memory medium;
   image forming means for forming the image information from said readout means;
   interface means for synchronizing said readout means with said image forming means, wherein said interface means comprises a plurality of line buffer memories for storing the image information read by said readout means;
   generating means for generating an indicating signal which indicates that the image information stored in said plurality of line buffer memories should be output to said image forming means; and
   control means for controlling said interface means such that the image information stored in said plurality of line buffer memories is output to said image forming means before the image information designated by said designating means, corresponding to each of said plurality of pages, has been completely read out by said readout means.

2. An image processing system according to claim 1, wherein said memory medium is a disk memory.

3. An image processing system according to claim 2, wherein said disk memory comprises a photo-magnetic recording medium.

4. An image processing system according to claim 1, wherein said generating means generates said indicating signal in synchronization with the operating rate of said image forming means.

5. Am image processing system according to claim 1, wherein said image forming means comprises a laser beam printer and wherein said indication generating means includes detecting means for detecting a laser beam from said laser beam printer.

6. Am image processing system according to claim 1, wherein said interface means reads the image information stored in said plurality of said line buffer memories in order to output it to said image forming means while writing said image information from said readout means into said plurality of said line buffer memories.

7. An image processing system according to claim 1, wherein said control means controls a write address and a read address of said plurality of line buffer memories.

8. An image processing system according to claim 7, wherein said control means controls said read address in synchronization with the indicating signal.

9. An image processing system comprising:
   image information generating means for generating image information;
   memory means capable of storing image information representative of a plurality of images generated by said generating means, wherein said memory means stores said image information such that each of said images can be read out by designation;
   interface means for synchronizing said generating means with said memory means, wherein said interface means comprises a plurality of line buffer memories for temporarily storing the image information from said image information generating means;
   generating means for generating an indicating signal in order to read the image information stored in said plurality of line buffer memories and for outputting the image information to said memory means; and
   control means for controlling said interface means such that the image information stored in said plurality of line buffer memories is read out to said memory means before said image information generating means has completely generated the image information.

10. An image processing system according to claim 9, wherein said memory means is a disk memory.

11. An image processing system according to claim 10, wherein said disk memory comprises a photo-magnetic recording medium.

12. An image processing system according to claim 9, wherein said image information generating means comprises readout means for reading an original image from which is generated image information representative of the original image.

13. An image processing system according to claim 9, wherein said indicating signal generating means generates the indicating signal in synchronization with the operating rate of said memory means.

14. An image processing system according to claim 9, wherein said interface means reads the image information stored in said plurality of said line buffer memories in order to output the image information to said memory means while writing the image information from said image-information generating means into said plurality of said line buffer memories.

15. An image processing system according to claim 9, wherein said control means controls a write address and a read address of said plurality of line buffer memories.

16. An image processing system according to claim 15, wherein said control means controls said read address in synchronization with the indicating signal.

17. An image processing system according to claim 9, further comprising designating means for designating a storage location, in said memory means, in which said image information should be stored.

18. An image processing system according to claim 9, further comprising designating means for designating the size of the image information generated by said image information generating means.

19. An image processing system according to claim 9 further comprising selecting means for selecting one of a first mode of operation of said image processing system in which said image processing system stores image information in said memory means and a second mode of operation of said image processing system in which said image processing system reads out the image information stored in said memory means.

20. An image processing system according to claim 19, wherein when said selecting means selects the first mode, the image information generated by said image information generating means is stored in said plurality of line buffer memories, and when said selecting means selects the second mode, the image information read out from said memory means is stored in said plurality of line buffer memories.

21. An image processing system according to claim 9, further comprising designating means for designating desired image information to be read out from said memory means and which corresponds to a plurality of pages.

22. An image processing system according to claim 9, wherein said image forming means includes a laser beam printer and wherein said indication generating means includes detecting means for detecting a laser beam from said laser beam printer.

23. An image processing system according to claim 19, wherein said image information generating means includes first synchronizing means for generating a first synchronization signal for permitting generation of image information, wherein said readout means includes second synchronizing means for generating a second synchronization signal for permitting a readout of image information, and wherein said first and second synchronizing means write the image information into said plurality of line buffer memories in response to said first synchronization signal in the first mode and in response to the second synchronization signal in the second mode, respectively.

24. An imge processing system comprising:
a memory medium capable of storing image information representative of a plurality of images;
designating means for designating desired image information to be read out from said memory medium and which corresponds to a plurality of pages;
readout means for reading, in order, image information designated by said designating means, from said memory medium;
a plurality of image forming means for forming the image information from said readout means;
a plurality of interface means, each corresponding to a different one of the plurality of said image forming means, for synchronizing said readout means with said image forming means, wherein said plurality of interface means comprises a plurality of line buffer memories for storing the image information read by said readout means;
a plurality of generating means, each corresponding to a different one of the plurality of said image forming means and for generating an indicating signal which indicates that the image information stored in said plurality of line buffer memories should be output to said plurality of image forming means; and
control means for controlling the plurality of said interface means such that the image information designated by said designating means, corresponding to each of said plurality of pages, is simultaneously outputted to said plurality of image forming means.

25. An image processing system according to claim 24, wherein said memory medium is a disk memory.

26. An image processing system according to claim 25, wherein said disk memory comprises a photomagnetic recording medium.

27. An image processing system according to claim 24, wherein the plurality of generating means generates the indicating signal in synchronization with the operating rate of said corresponding image forming means.

28. An image processing system according to claim 24, wherein said image forming means comprises a laser beam printer and wherein said indication generating means includes detecting means for detecting a laser beam from said laser beam printer.

29. An image processing system according to claim 24, wherein each of said plurality of interface means reads the image information stored in said plurality of line buffer memories in order to output the image information to said corresponding image forming means while writing the image information from said readout means into said plurality of line buffer memories.

30. An image processing system according to claim 24, wherein said control means controls a write address and a read address of said plurality of line buffer memories.

31. An image processing system according to claim 30, wherein said control means controls said read address in synchronization with the indicating signal.

32. An image processing system according to claim 24, wherein said control means controls said plurality of interface means such that said image information stored in said line buffer memories is output to said plurality of said image forming means before the image information stored in said memory medium has been completely read out by said readout means.

* * * * *

UNITED STATES PATENT AND TRADEMARK OFFICE
CERTIFICATE OF CORRECTION

PATENT NO. : 4,899,291

DATED : February 6, 1990

INVENTOR(S) : MASAHARU TSUNKADA ET AL.

It is certified that error appears in the above-identified patent and that said Letters Patent is hereby corrected as shown below:

IN THE DRAWINGS,

SHEET 13 OF 19

Fig. 6(a), "ERASS" should read --ERASE--.

COLUMN 1

Line 5, "12/7/87" should be deleted.
      Line 24, "herein." should read --therein--.
      Line 27, "a difficulty of read time storing." should read
          --read time storing being disadvantageous.--.

COLUMN 2

Line 6, "crase" should read --erase--.

COLUMN 4

Line 16, "least" should read --lest--.
      Line 64, "having" should read --is--.

COLUMN 5

Line 9, "crasing" should read --erasing--.
      Line 10, "crased" should read --erased--.

UNITED STATES PATENT AND TRADEMARK OFFICE
CERTIFICATE OF CORRECTION

PATENT NO. : 4,899,291

DATED : February 6, 1990

INVENTOR(S) : MASAHARU TSUNKADA ET AL.

It is certified that error appears in the above-identified patent and that said Letters Patent is hereby corrected as shown below:

COLUMN 6

Line 35, "its" should read --for--.

COLUMN 8

Line 32, "the disk" should read --the reader, the write operation for the image onto the disk--.

COLUMN 10

Line 23, "Am" should read --An--.
Line 28, "Am" should read --An--.

COLUMN 11

Line 17, "image-information" should read --image information--.
Line 27, "said" (second occurrence) should read --the--.
Line 33, "claim 9" should read --claim 9,--.

UNITED STATES PATENT AND TRADEMARK OFFICE
CERTIFICATE OF CORRECTION

PATENT NO. : 4,899,291

DATED : February 6, 1990

INVENTOR(S) : MASAHARU TSUNKADA ET AL.

It is certified that error appears in the above-identified patent and that said Letters Patent is hereby corrected as shown below:

COLUMN 12

Line 3, "imge" should read --image--.

Signed and Sealed this

Twenty-first Day of January, 1992

Attest:

HARRY F. MANBECK, JR.

*Attesting Officer*     *Commissioner of Patents and Trademarks*